May 25, 1965  F. C. BREWSTER  3,185,916
VOLTAGE REGULATOR WITH LOAD COMPENSATION
Filed Oct. 20, 1961
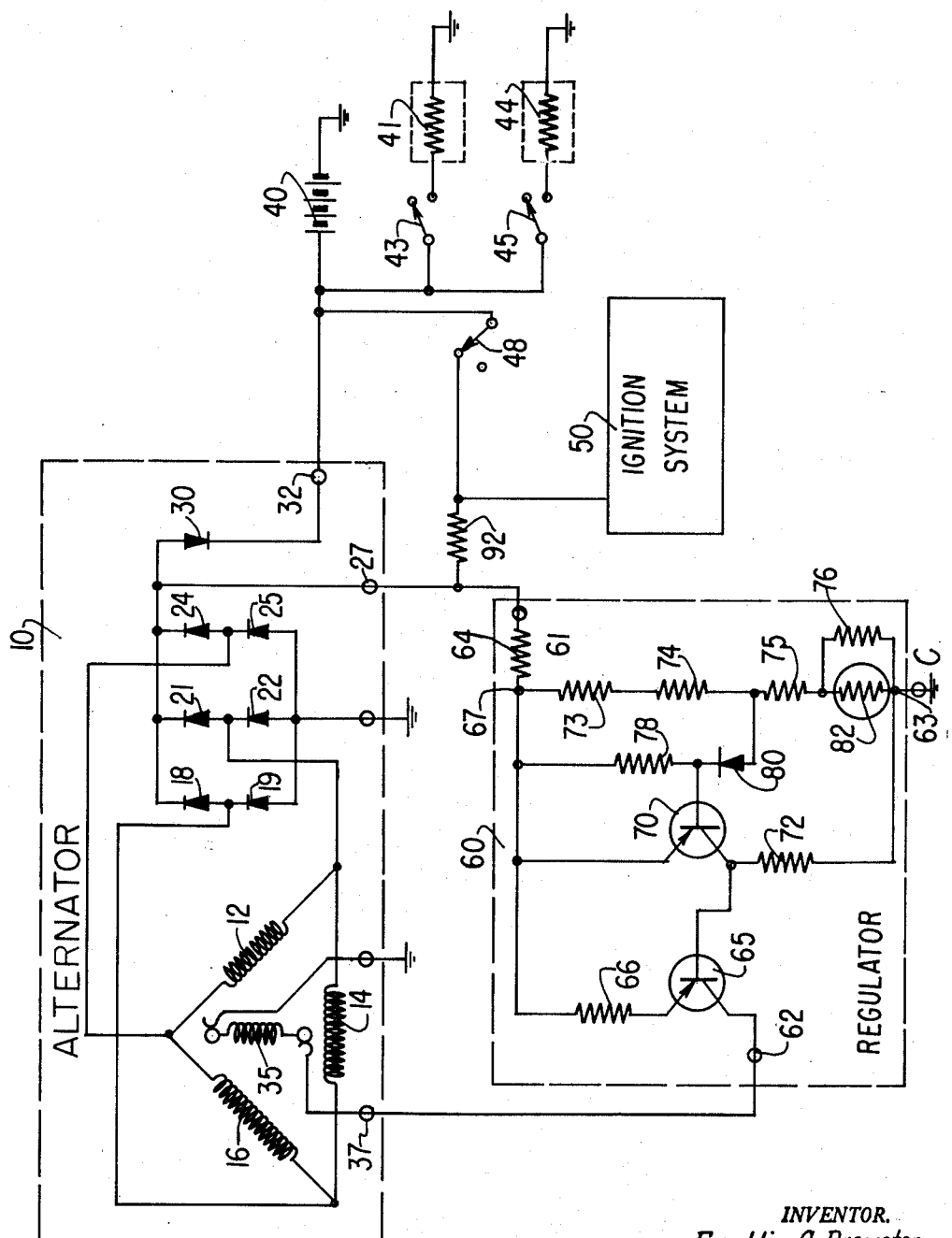
INVENTOR.
Franklin C. Brewster
BY
Mueller & Aichele
Attys.

United States Patent Office 3,185,916
Patented May 25, 1965

3,185,916
VOLTAGE REGULATOR WITH LOAD COMPENSATION
Franklin C. Brewster, Franklin Park, Ill., assignor to Motorola, Inc., Chicago, Ill., a corporation of Illinois
Filed Oct. 20, 1961, Ser. No. 146,558
7 Claims. (Cl. 322—28)

This invention relates to a vehicular electrical system and more particularly to an improved means for regulating the voltage in a battery charging circuit for such a system.

Most present day vehicles use either a direct current generator or an alternator with associated rectifiers to supply current to the battery and the electrical accessories of the vehicle. Regulation of the voltage to produce battery charging current, which voltage may vary over a wide range under normal operating conditions, is usually accomplished by sampling the output voltage and feeding back a correcting current to a field winding of the generator or alternator to produce a corresponding change in its terminal voltage. Suitable regulators are usually either of the electro-mechanical or semiconductor switching type in which the current fed back to the field winding is switched "on" and "off" at a rate proportional to the change in output voltage above or below a predetermined value to effect a corresponding change in its average value. In any such voltage regulating circuit, perfect regulation between no load and full load can be achieved theoretically with infinite "loop gain" of the overall feedback circuit. High loop gain systems which approach the ideal condition are complex, expensive, and unreliable under adverse environmental conditions. Thus, to meet the stringent requirements of cost, reliability, simplicity, and compactness required by the automotive industry, practical voltage regulators often permit an appreciable drop in regulated voltage between no-load and full load operation.

There is increasing recognition of the advantages of the substitution of an alternator with associated rectifiers for the generator in vehicular electrical systems. A natural corollary of such a substitution would be the use of a completely transistorized voltage regulator in the system to still further reduce the number of moving mechanical parts and attendant maintenance problems. Transistorized regulator circuits producing a high loop gain generally require a large number of critically adjusted circuit components. This gives rise to cost and production problems to be overcome if such improvements are to successfully compete with the more conventional generator and electromechanical regulator systems. Thus, means for improving the regulation characteristics of existing regulating circuits is particularly significant in view of present day trends towards transistorization.

Accordingly, it is an object of this invention to provide a vehicular electrical system with improved voltage regulation characteristics.

Another object is to prevent or minimize reduction in a regulated voltage upon an increase in load current.

Another object is to provide a simple and effective load sensitivity correction means for a semiconductor voltage regulator.

A feature of this invention is the provision of means for introducing a controlled regenerative effect in a regulator furnishing field winding current for air alternator or generator to improve regulation with varying load currents.

Another feature of the invention is the provision of a small resistance between the system supply voltage and a voltage regulator which resistance carries field current of a machine producing the voltage so that the regulator responds to the supply voltage varied as a function of field winding current.

In the drawing:

The single figure is a schematic diagram of a vehicular electrical system incorporating the invention.

In a specific form, the invention is operative in a system having an alternator together with associated rectifiers and a semiconductor voltage regulator. However, the invention may also be used with a direct current generator having a field winding, and with other types of voltage regulators. The rectified output of the alternator provides a direct current through an isolation diode to a chargeable battery and other electrical equipment. A compensating resistance is provided between the alternator direct current output and a voltage regulator. The regulator is connected to the field winding of the alternator to control the output voltage of the system. Thus, a field excitation current path is provided from the direct current output of the alternator, through the compensating resistor, to the regulator, and then through the field winding of the alternator to a ground reference point. When the direct current output voltage drops by reason of heavy current loading, the regulator increases the field current to raise the alternator output. This increased field current produces an additional drop across the resistor so that the regulator responds to a still lower output voltage and the compensation further increases accordingly. This additional compensation is sufficient to offset the inherent drop in voltage of the regulator at high load currents and produces substantially constant regulation without the use of additional high gain circuits in the regulator.

In FIG. 1 the alternator 10, which may be driven from the engine of a vehicle in which the electrical system is incorporated, includes armature windings 12, 14 and 16 connected in delta. As an alternative, a Y connection could also be used. The corners of the delta are connected to the respective interconnections of semiconductor power rectifier pairs 18, 19 and 21, 22 and 24, 25. One side of rectifiers 19, 22 and 25 are connected to a common reference ground potential which may conveniently be the alternator frame, while the other side of rectifiers 18, 21 and 24 are connected to an output terminal 27 of the alternator. The rectifiers are poled to produce full wave rectification of the three phase output of the alternator. The direct current so produced (positive with respect to the reference ground in the illustrative circuit shown) appears at output terminal 27 of alternator 10, which alternator preferably is formed as a unitary structure with the semiconductor rectifiers.

An isolation diode 30, also preferably formed as a structural part of alternator 10, is connected between output terminal 27 and an additional output terminal 32. Diode 30 is poled to provide conduction from the rectified output of the alternator to output terminal 32. Alternator 10 also includes field winding 35, connected through the usual slip rings and brushes to the reference ground and to a field current supply terminal 37.

The load for the direct current output of alternator 10, connected between output terminal 32 and a reference point, is typically a storage battery 40 and a plurality of electrical accessories on the vehicle, conveniently represented by resistors 42, 44 and operably connected by switches 43, 45. These loads could represent such items such as a starter, lights, radio, and other electrically operated accessories common on vehicles.

An ignition switch 48 includes a movable contact connected to a terminal on battery 40 and a fixed contact connected to the ignition circuit 50 of the type common for internal combustion engines.

Since alternator 10 will be turned at various speeds dependent upon the engine speed of the vehicle, it is desirable that the magnetic retentivity in the alternator be virtually zero so that at high speeds the alternator voltage output can be sufficiently reduced by reduction of field current in field winding 35. This means that upon starting, the field current must be externally supplied in order to obtain an initial output. Although it is known to connect the field of the alternator to the battery upon starting, this produces an additional high current drain at a time when maximum current is needed for starting. To limit the initial field current, resistor 92 is provided between a fixed contact on switch 48 and input terminal 61 of voltage regulator 60. Thus, when switch 48 is closed, a small field current, in the order of one-fourth ampere, is supplied to the field winding until the alternator is turning at sufficient speed to develop a potential at terminal 27 sufficient to supply its own field excitation.

Although various types of voltage regulators may be used in the system, a transistorized regulator is advantageous from the standpoint of improved control and reliability. The transistorized voltage regulator 60 has an input terminal 61 which is electrically connected to intermediate output terminal 27 of alternator 10. The electrical path from the alternator to the input of the regulator includes a resistor 64. The regulator further includes a field current supply terminal 62 connected to terminal 37 of the alternator. Regulator 60 is connected to ground or a reference point for the electrical system through a suitable reference conductor 63.

The PNP power transistor 65 of regulator 60 has a collector electrode connected to terminal 62 and an emitter electrode connected through bias resistor 66 to lead 67. The emitter-collector conduction path of transistor 65 accordingly completes a field current path from terminal 27 of alternator 10, through resistance 64 to transistor 65, and then to field current input terminal 37 and through field winding 35 to reference ground. The current or potential for the base electrode of transistor 65 is varied in accordance with the output of alternator 10 at terminal 27 in order to control the current through field winding 35 for regulating the alternator output.

The base control voltage for transistor 65 is established by the emitter-collector electrode current path of PNP control transistor 70 and the resistor 72 which are connected in series between lead 67 and reference point 63. The junction of the collector of transistor 70 and resistor 72 is connected to the base of transistor 65.

A voltage divider including resistors 73, 74, 75 and 76 are series connected between lead 67 and reference point 63. Temperature dependent resistor 82, selected to effectively track charging voltage requirements of battery 40 at different temperatures, is connected across resistor 76. A further resistor 78 is series connected with zener diode 80 between lead 67 and the junction of resistors 74, 75. The junction between resistor 78 and zener diode 80 is connected to the base of transistor 70. The voltage divider 73-76 produces a bias potential on zener diode 80 so that it will conduct when a given voltage exists between lead 67 and reference point 63. When diode 80 conducts it establishes a constant potential at the base of transistor 70 so that any variation in the voltage of lead 67 will be reflected as a change in emitter voltage of transistor 70.

Accordingly, as the output voltage of the alternator as seen at terminal 27 increases above a predetermined value, diode 80 conducts to establish a fixed potential at the base electrode of transistor 70 and its emitter voltage will increase to cause increased emitter to collector conduction. A current gain is experienced, and the voltage established at the base of transistor 65 by increased current through resistor 72 tends to reduce the emitter-collector conduction in transistor 65 and thus reduce the current supplied to field winding 35. This reduced field current in turn causes a reduction of the output voltage of the alternator so that the voltage at common point 67 of the regulator is low enough to cause diode 80 to cut off. There is a resultant decrease in the conduction of transistor 70 and the base potential established at transistor 65 tends to increase its emitter-collector conduction to supply increased field current, causing the alternator output voltage to rise. Such a cycling of the alternator output voltage above and below the established regulation point of regulator 60 will continue at a faster or slower rate to produce an average current through the field winding which provides the desired regulated output voltage.

As discussed above, although it is possible to design a regulator which will produce a substantially constant voltage over the wide load current range required by vehicular equipment, such would require more complex circuitry than the simple, reliable transistorized regulator shown. However, proper selection of the value for resistance 64 will provide compensation for any inherent voltage drop in the regulated loop, resulting in a substantially constant regulation characteristic. With resistance 64 in the circuit in the manner shown, regulator 60 actually sees and tends to compensate for the voltage that exists at lead 67. The entire current to the regulator, which includes the field control current and the current necessary to establish a reference voltage across zener diode 80 and current through control transistor 70, produces a voltage drop across resistance 64 such that the voltage at output terminal 27 is higher than that to which the regulator responds at lead 67. The higher the field current demands, as is the case when the entire system is drawing heavy load currents, the greater this voltage difference. Thus, the compensating voltage developed across resistance 64 causes the regulator to regulate at a differentially higher level which is proportional to the vehicular system loading. This differentially higher level of regulation is sufficient to compensate for inherent drop in the regulation loop to produce a substantially constant voltage output over wide ranges of load current.

Resistance 64 is shown as a fixed resistor physically located in the regulator and electrically connected between input terminal 61 and input lead 67. So connected the resistor is in series with the point (terminal 27) at which the voltage is to be regulated and the point (lead 67) to which the regulator responds. It is to be understood however, that the resistance value in this path need not be a resistor located in the regulator but may, for example, be located on the input side of terminal 61 or be a predetermined length of resistance wire interconnecting terminals 61 and 67 to selectively produce the same electrical effect.

In a particular successful embodiment of the invention, the circuit constants of the regulator were as follows:

| | |
|---|---|
| Transistor 65 | 2N176. |
| Transistor 70 | 2SB56. |
| Diode 80 | ¼M 11Z5. |
| Resistor 64 | 0.4 ohm. |
| Resistor 66 | 0.2 ohm. |
| Resistor 72 | 100 ohms. |
| Resistor 73 | 150 ohms, nominal (68–220 ohm range). |
| Resistor 74 | 68 ohms. |
| Resistor 75 | 18 ohms. |
| Resistor 76 | 22 ohms. |
| Resistor 78 | 150 ohms. |
| Thermistor 82 | 40 ohms at 25° C. |

A typical vehicular electrical system utilizing a 12 volt battery may be designed to operate at loads between 0 and 45 amperes. The voltage drop at the battery in such systems between no-load and full load may be between 1.0 and 0.5 volts. In a system utilizing a transistorized regulator according to these specifications, with the resistance value 64 selected to be 0.4 ohm, constant voltage could be maintained at the battery over the entire current range.

Accordingly, this invention provides a simple and effective means to minimize the reduction in the regulated voltage of vehicular electrical systems at high load currents. It is particularly useful in electrical vehicular systems employing an alternator and a transistorized regulator in that it is not necessary to use complex transistor circuitry to obtain a constant voltage over a wide current range.

I claim:

1. A voltage regulating circuit for use with a vehicular electrical system including in combination, a first input conductor, a second input conductor, an output conductor, a common terminal, current conduction means having an input terminal connected to said common terminal, an output terminal connected to said output conductor, and a control terminal, voltage sensing means connected between said common terminal and said second input conductor, means interconnecting said voltage sensing means and said control terminal, and resistor means connected between said first input conductor and said common terminal to provide a differential voltage drop between the voltage sensing means and the input terminal whereby correction is made for drop in system voltage due to high load currents.

2. A voltage regulating circuit for use with a vehicular electrical system having a source of direct current potential, said circuit including in combination, a voltage regulator, said regulator including first and second input terminals and an output terminal, first transistor circuit means connected between said first input terminal and said output terminal to control current conduction therebetween, voltage divider means connected between said first and second input terminals, zener diode circuit means connected between a tap joint on said voltage divider and said first input terminal, second transistor circuit means connected between said first and second input terminals and responsive to the voltage therebetween, means connecting said zener diode circuit means to the input of said second transistor circuit means, means connecting the output of said second transistor circuit means to the input of said first transistor circuit means; and resistance means connecting the said first input terminal of the regulator to said potential source, whereby current conduction between the first input terminal and the output terminal of the regulator produces a compensating voltage drop across said resistance means.

3. A voltage regulating circuit for use with a vehicular electrical system including in combination, a first input conductor, a second input conductor, an output conductor, a common terminal, a first resistor connected between said first input conductor and said common terminal, current conduction means including a power transistor and a second resistor series connected between said common terminal and said output conductor, voltage divider means having a tap point connected between said common terminal and said second input conductor, a third resistor connected to said common terminal and a zener diode connected between said third resistor and said tap point, circuit means including a control transistor and a fourth resistor connected between said common terminal and said second input terminal, means connecting the junction between the zener diode and the third resistor to the input of said control transistor to provide an input signal responsive to voltage changes between said common terminal and said second input conductor, and means connecting the output of said control transistor to the input of said power transistor to control curent conduction therethrough in response to said voltage changes.

4. A vehicular electrical system including in combination, an alternator having armature winding means and field winding means, a direct current output terminal, rectifier means connecting said armature winding means to said terminal output terminal, a load circuit connected between said output terminal and a reference potential, a voltage regulating circuit including an output circuit, voltage sensing means, and resistor means having a first terminal connected to said output terminal and a second terminal, said output circuit connecting said field winding means to said second terminal whereby the current through said field winding means flows through said resistor means to produce a voltage drop thereacross, said voltage sensing means being connected between said control terminal and said reference potential, said voltage sensing means being coupled to said output circuit and controlling the current therein in response to the voltage between said second terminal and said reference potential whereby correction is made for the drop in the voltage at said second terminal due to high load currents.

5. A vehicular electrical system including in combination, a source of direct current potential having a control terminal for regulating the output potential and an output terminal, a load circuit connected between said output terminal and a reference potential, a voltage regulating circuit including an output circuit, voltage sensing means and resistor means having a first terminal connected to said output terminal and a second terminal, said output circuit connecting said control terminal to said second terminal whereby the current through said control terminal flows through said resistor means to produce a voltage drop thereacross, said voltage sensing means being connected between said second terminal and said reference potential, said voltage sensing means being coupled to said output circuit and controlling the current therein in response to the voltage between said second terminal and said reference potential whereby correction is made for the drop in the voltage at said second terminal due to high load currents.

6. A vehicular electrical system including in combination, a source of direct current potential having a control terminal for regulating the output potential and an output terminal, a load circuit connected between said output terminal and a reference potential, a voltage regulating circuit including a first resistor having a first terminal connected to said output terminal and a second terminal, an output circuit including a power transistor and a second resistor series connected between said second terminal and said control terminal, voltage divider means having a tap point connected between said second terminal and said reference potential, a third resistor connected to said second terminal and a zener diode connected between said third resistor and said tap point, circuit means including a control transistor and a fourth resistor connected between said second terminal and said reference potential, first circuit means connecting the junction between said zener diode and said third resistor to the input of said control transistor to provide an input signal responsive to voltage changes between said second terminal and said reference potential, and second circuit means connecting the output of said control transistor to the input of said power transistor to control current conduction therethrough in response to the voltage between said second terminal and said reference potential whereby correction is made for the drop in the voltage at said second terminal due to high load currents.

7. A voltage regulator system for use with generator apparatus providing a direct current potential and having a reference terminal, an output terminal, and a control terminal to which current is applied for regulating the potential at the output terminal, said voltage regulator system including in combination, an output circuit, voltage sensing means, and resistor means having first and second terminals with the first terminal thereof being connected to the output terminal of the generator apparatus, said output circuit connecting said second terminal of said resistor means to the control terminal of the generator apparatus so that the current applied to the control terminal flows through said resistor means to produce a voltage drop thereacross, said voltage sensing means being connected between said second terminal and the reference terminal and being responsive to the potential at said second terminal, said voltage sensing means being coupled to said output circuit and controlling the current therethrough in accordance with the voltage at said second terminal to thereby control the potential at the output terminal, whereby correction is made for the drop in the voltage at said second terminal due to increased current applied to the control terminal.

References Cited by the Examiner
UNITED STATES PATENTS 2,809,301   10/57   Short.
2,945,174   7/60    Hetzler.

LLOYD McCOLLUM, *Primary Examiner.*